Nov. 17, 1953          F. M. GUY          2,659,244
COMBINED RESILIENT COUPLING AND VIBRATION DAMPENER
Filed Sept. 16, 1949          2 Sheets-Sheet 1
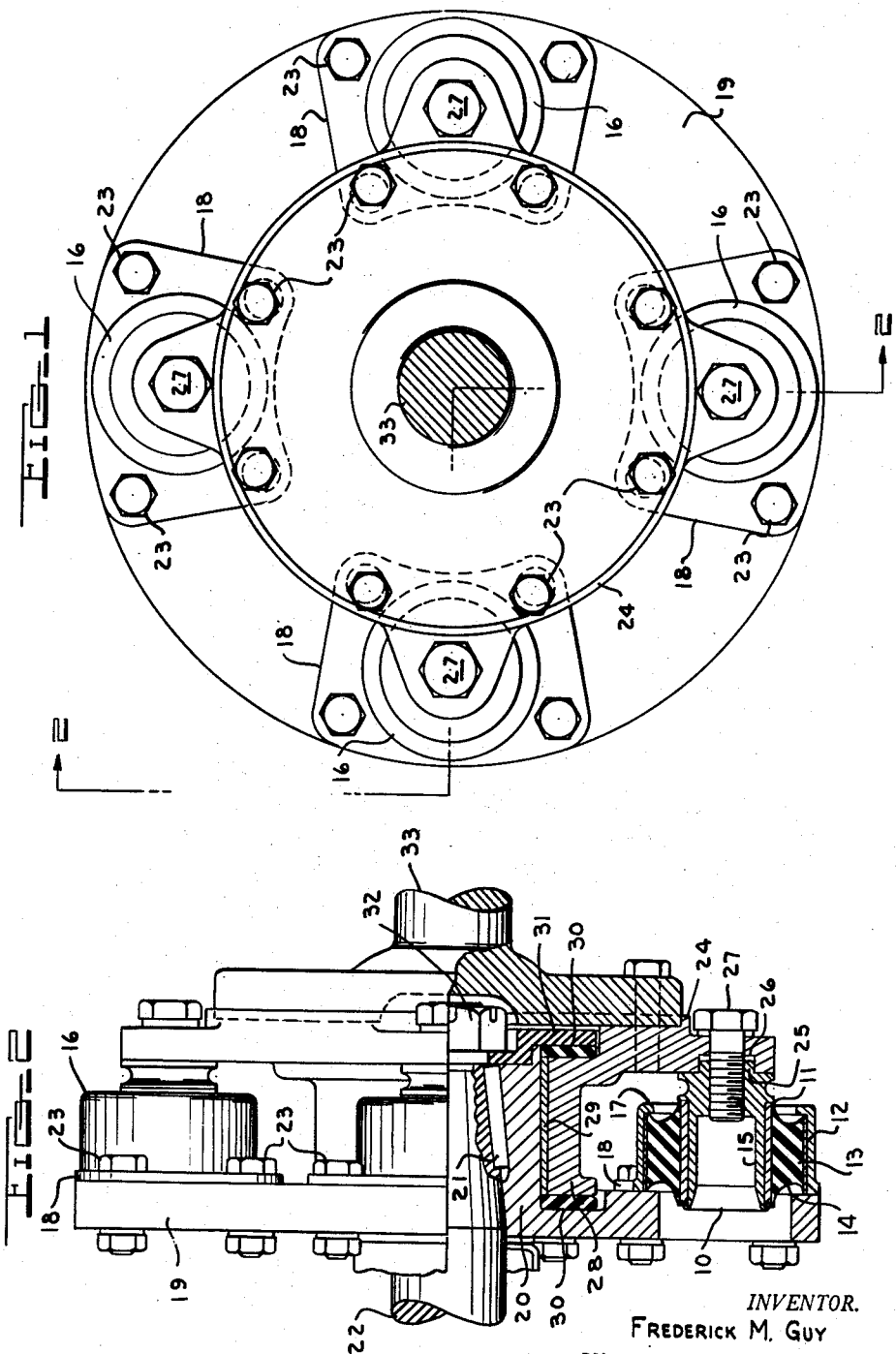
INVENTOR.
FREDERICK M. GUY
BY Arthur M. Smith
ATTORNEY

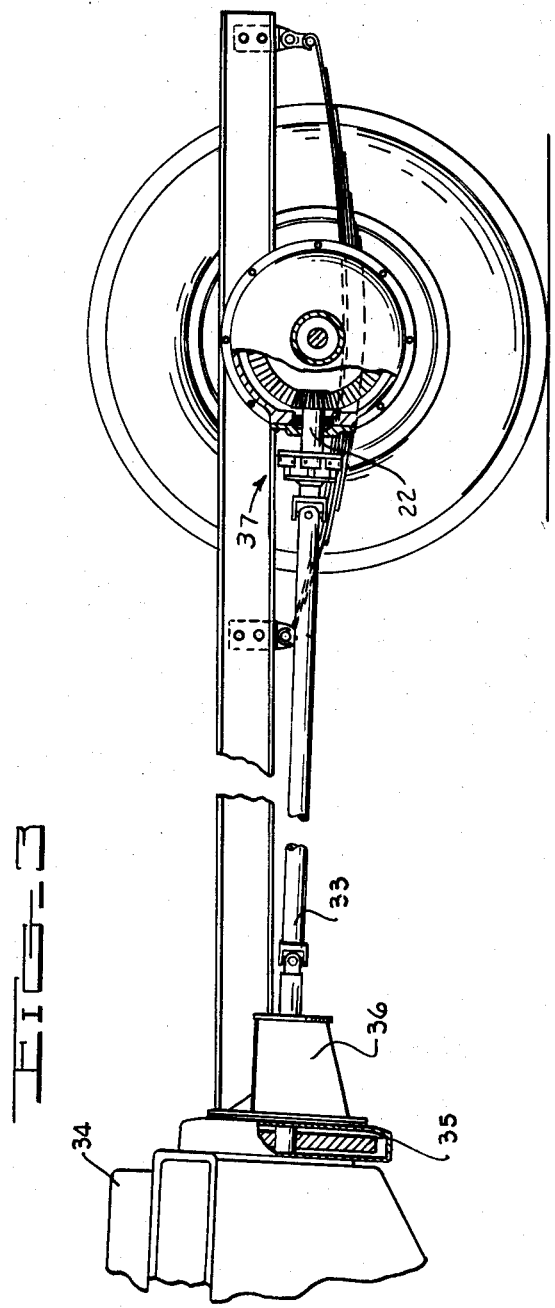

Patented Nov. 17, 1953

2,659,244

UNITED STATES PATENT OFFICE 2,659,244

COMBINED RESILIENT COUPLING AND VIBRATION DAMPENER

Frederick M. Guy, Detroit, Mich., assignor to U. S. Universal Joints Company, Detroit, Mich., a corporation of Michigan Application September 16, 1949, Serial No. 115,998

2 Claims. (Cl. 74—574)

1

The present invention relates to a vibration and sound dampener in the form of a resilient coupling having a flywheel effect and more particularly to such a device in which resilient elements are interposed between the driving and driven shaft to provide a flexible driving connection.

An object of the present invention is to provide a construction which has a flywheel effect in absorbing undampened power surges transmitted through a power driven shaft and which will eliminate run out of the shaft and consequent vibration and attendant noise from the drive shaft of a torque transmitting system. Large transit type busses and similar types of motor propelled vehicles have encountered this difficulty which is due in large part to intermittent power surges through the propeller shaft which are transmitted into the drive pinion and make it difficult to keep the drive pinion in mesh with the ring gear. This is due in part to the use of the light flywheels which are necessary in order to permit rapid acceleration of the motor and also to reduce the gas consumption therein, but which are insufficient in weight to absorb all the power surges from the motor.

It is a further object of the present invention to provide a yielding but positive connection between a driving and driven shaft whereby irregularities in the transmitted torque loads are cushioned by a resilient coupling which also has a flywheel effect which provides a smooth flow of power to the shafts connected through the joint or coupling with a minimum amount of power loss and with minimum vibration.

It is a further object of the present invention to provide an improved combined vibration dampener and flexible coupling which provides a joint or coupling which is extremely quiet in its operation, is not affected by dirt or grit and which does not require lubrication.

It is a further object of the present invention to provide a vibration dampener and flexible coupling of the resilient type particularly adapted for use where a high capacity and heavy duty joint or flexible coupling is required and in which the space limitations require a compact design and construction of the unit.

It is a further object of the present invention to provide an improved vibration dampener and flexible coupling in which all parts are centralized in a unitary carrier to provide a joint or coupling of balanced construction which runs true without backlash during its operation, the design of the unit and the resilient drive member

2 mounted therein permitting the economical manufacture of the joint or coupling by mass production methods within rather broad tolerance limits.

It is a further object of the present invention to provide an improved vibration dampener and flexible coupling in which the construction of the assembly permits the ready installation or removal of the joint or coupling between the driving and driven members attached respectively to the driving and driven shafts and in which, because of its design and construction, the size and weight of the unit are held to a minimum for the load capacity of the joint or coupling.

Other objects of this invention will appear in the following description and appended claims, reference being had to the accompanying drawings forming a part of this specification wherein like reference characters designate corresponding parts in the several views.

In the drawings:

Fig. 1 is a front elevation of a combined resilient coupling and vibration dampener embodying the present invention.

Fig. 2 is a side elevation, partially in section, taken in the direction of the arrows substantially on the line 2—2, Fig. 1.

Fig. 3 is a sectional side view of the chassis of a motor vehicle utilizing the coupling of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The coupling of the present invention utilizes a plurality of resilient bushings indicated generally by the numeral 10. Each of the plurality of resilient bushings 10 includes a centrally located core 11 and a circumferential shell 12 spaced concentrically with relation to said core, and an annular body 13 of resilient material, preferably molded natural or synthetic rubber or a blend thereof which is secured or bonded to the said core 11 and the said shell 12. The faces 14 of the annular body 13 are channeled to provide annular groove portions in each end of the bushing which extend concentric to the core 11 and shell 12.

In each of the resilient bushings 10, a connector stud 15 is secured to the core 11 and provides a means for effecting a positive mechanical connection between a part to be connected and the annular body 13 of resilient material. A flanged open end pocket or cup 16 is provided for each of the plurality of resilient bushings 10. Each pocket or cup 16 has an annular flange portion 17 which surrounds the open end thereof and bears against the edge of the circumferential shell 12 to retain the bushing 10 in a predetermined location in said cup 16. The connector studs 15 of all the resilient bushings 10 extend through the openings in the ends of the cups 16 to permit a mechanical connection directly with said studs 15 independently of said cups 16.

Each of the cups 16 is essentially cylindrical in shape and is provided with a connector flange 18 extending outwardly from the base thereof to permit a positive connection between said cups 16 and the carrier plate 19. As shown in Fig. 1, the preferred shape given the connector flanges 18 is that of a truncated radial segment which permits close spacing of any desired number of the cups 16 about a circular carrier or connector plate. While this particular shape is shown, it is apparent that the shape of the flanges 18 is not critical when used with the types of carrier plates here shown.

Although the cups 16 are shown as separate detachable members in the drawings, they may be formed as an integral part of the carrier 19 without departing from my invention.

The combined resilient coupling and vibration dampener of the present invention consists of an inertia member which provides a flywheel effect. Such a member, for example, is the annular carrier plate 19 which is provided with a relatively heavy flange or rim to give the member a large moment of inertia and thus render it capable of storing energy upon rotation which can be delivered back to the drive system in a manner similar to that in which a flywheel functions. The annular carrier plate 19 is provided with a central hub 20 which is slotted to accommodate the key 21 which provides a driving connection between the hub 20 and a drive shaft 22. A plurality of equally spaced holes are provided near the periphery of the carrier plate 19 and the insert pockets or cups 16 are fitted over these holes with the pocket flange 18 lying against the carrier plate 19. The pockets or cups 16 are attached to the carrier plate 19 by any means such for example as machine bolts 23. The pockets or cups 16 containing the resilient bushings 10 are connected through the resilient bodies 13 by means of the connector stud 15 to the propeller shaft attaching member 24. A male pilot end portion 25 is formed on the end of each connector stud 15 and seats in the female locating recess 26 provided in the propeller shaft attaching member 24, said connector stud 15 being provided with a screw-threaded recess to accommodate the bolts 27. The propeller shaft attaching member 24 is provided with a hollow central hub 28 which fits over the carrier hub 20 and is separated therefrom by the self-lubricating bronze bushing 29 which permits movement of the hub 28 relative to the hub 20 of the carrier plate 19. One end of said attaching member hub 28 is separated from the face of the carrier plate 19 by a resilient thrust washer 30. Another resilient thrust washer 30 is located at the opposite end of the propeller shaft attaching member 24 and an annular retaining member 31 is located against said resilient thrust washer 30, the resilient thrust washers 30 and retaining member 31 being held against the carrier plate hub 20 by the nut 32 which is attached to the end of the drive shaft 22. Thus the relative movement between the hub 28 and the hub 20 is cushioned and restrained by the resilient thrust washers 30. The propeller shaft attaching member 24 is grooved on one face to provide means for locating the flange of the propeller shaft 33.

In this construction, it will be seen that torque is transmitted from the driving to the driven member through the cores 11 of all the resilient bushings 10 in the assembly. The resilient bushings 10 and the joint or coupling are held in alignment by the connections between the studs 15 and the propeller shaft attaching member 24 which also acts to distribute the load over all the resilient bushings 10. In this manner, localized loading of the bushings or localized strains in the joint or coupling are eliminated and hence the useful service life of the bushings is increased over constructions in which the loading is localized on a few of the resilient bushings. It is characteristic of resilient bushings of the type herein utilized that the greatest load will be localized in the weakest bushing or in the weakest parts of the bushings. The construction herein disclosed assures the distribution of the loads over all of the resilient bushings and hence by this mechanical distribution of the loads, overloading and resultant failure of any particular bushing or group of bushings is prevented. Relative movement of the driving and driven members is accommodated by the displacement of all the core portions 11 relative to all the shell portions 12 of all the resilient bushings 10. This displacement is accommodated by displacement of the annular bodies of resilient material 13 and hence all movements and vibrations of the driving and driven members are resiliently cushioned by the construction here disclosed.

It is to be understood that in the construction herein disclosed, the carrier plate 19 may be connected to the core portions of the resilient bushings 10 as may be desired. Hence, the reference to driving and driven members in this specification is solely for the purpose of describing the particular construction herein disclosed and is not to be considered as limiting the invention or of requiring any particular relationship between the connections of the pockets and the cores of the resilient bushings 10.

It is also to be understood that any desired number of resilient bushings 10 may be provided in the construction herein disclosed, the number being determined by the size and strength properties of the bushings and the loads to be carried by the flexible coupling. The particular arrangement of the bushings relative to the driving and driven members is determined to a large extent by the space limitations of the location in which the joint or coupling is to be employed.

As shown in the drawings, each resilient bushing 10 may be mounted in a separate detachable pocket. This makes the design particularly adaptable to a large variety of uses in that it permits a ready installation and removal of each bushing in the joint or coupling assemblies. Likewise, after a joint or coupling embodying the present invention has been in service, the individual blocks may be removed and replaced as may be required by the service conditions of the joint or coupling without disturbing others of the blocks in the assembly. This is particularly desirable where a joint or coupling of the present invention is installed for heavy duty work in a fixed installation, and in which the centers between the driving and driven members have been carefully prelocated and may not be readily changed. This is particularly the case in connection with the use of such units in heavy machinery, and in marine installations or the like.

By the construction of the device of the present invention, a difference in speed of rotation between the driven shaft 22 and driving or propeller shaft 33 causes a compression of the resilient members 13. To the extent that the members 13 are compressed, the propeller shaft attaching member 24 is permited to move on the bearing 29 relative to the hub 20 of the carrier plate 19. This movement is accomplished without any endwise displacement of the assembly so there is no opportunity to cause misalignment of the propeller shaft. The rotating mass 19 being rigidly mounted as a part of the driving axle pinion shaft rotates at all times with that shaft and absorbs vibrations due to variations in the power flow thereto. This holds the driving pinion teeth in meshed relation to the driving ring gear and eliminates the run out and gear chattering which otherwise occurs when there is a surge in the power flow through the propeller shaft.

The combined resilient coupling and vibration dampener is shown in position on a motor vehicle in Fig. 3 of the drawings. The motor of the vehicle is designated at 34. The crankshaft of the motor 34 is affixed to the engine flywheel 35 in the usual manner, and the engine flywheel is connected to the transmission 36. The propeller shaft 33 extends from the transmission 36. The combined coupling and vibration dampener shown in detail in Figs. 1 and 2 is indicated at 37 and is connected to the propeller shaft 33 and the drive pinion shaft 22 as previously explained.

Having thus described my invention, I claim:

1. In combination, an engine having a crankshaft, an engine flywheel in engagement with said crankshaft, a propeller shaft operatively coupled with said engine flywheel; a combined resilient coupling and vibration dampener including a connector member connected to the free end of said propeller shaft, resilient coupling means affixed to said connector member, and a carrier member affixed to said resilient coupling means, and a differential construction including a driving axle pinion which is in mesh with a driving ring gear, said pinion being mounted on a shaft which is rigidly connected with said carrier member and rotatable therewith, the carrier member of said combined resilient coupling and vibration dampener having its mass concentrated at its outer rim to provide a large moment of inertia in order that said carrier will absorb surges from the engine and hold the driving pinion in meshed engagement with the driving ring gear.

2. The combination as claimed in claim 1 and including a carrier member which has a hollow cylindrical hub extending transversely from the center thereof and affixed to said driving axle pinion shaft, a plurality of resilient bushings secured to the side of said carrier member, said connector member being connected to said resilient bushings and having means thereon for direct aligned connection to said propeller shaft, a hollow cylindrical hub on said connector members extending transversely from the center thereof toward said carrier member and overlying said carrier member hub, and a self-lubricating bearing interposed between said carrier member hub and said connector member hub to facilitate relative rotary movement between said hubs when there is a difference in the speed of rotation of said shafts, said hubs being secured against transverse movement to avoid misalignment of said shafts.

FREDERICK M. GUY.

References Cited in the file of this patent

UNITED STATES PATENTS

| Number | Name | Date |
|---|---|---|
| 299,013 | Robb et al. | May 20, 1884 |
| 379,022 | Morgan | Mar. 6, 1888 |
| 382,008 | Pole | May 1, 1888 |
| 1,760,492 | Hall | May 27, 1930 |

FOREIGN PATENTS

| Number | Country | Date |
|---|---|---|
| 171,295 | Great Britain | of 1921 |
| 474,581 | Great Britain | of 1937 |